(12) United States Patent
Nagura et al.

(10) Patent No.: US 8,864,093 B2
(45) Date of Patent: Oct. 21, 2014

(54) VEHICLE SEAT SLIDING APPARATUS

(71) Applicant: Aisin Seiki Kabushiki Kaisha, Kariya (JP)

(72) Inventors: Mikihito Nagura, Okazaki (JP); Naoaki Hoshihara, Obu (JP); Shinya Isobe, Nagoya (JP); Toshiaki Sasa, Kitanagoya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 52 days.

(21) Appl. No.: 13/759,322

(22) Filed: Feb. 5, 2013

(65) Prior Publication Data
US 2013/0206951 A1 Aug. 15, 2013

(30) Foreign Application Priority Data

Feb. 14, 2012 (JP) .................................. 2012-029626

(51) Int. Cl.
*B60N 2/06* (2006.01)
*B60N 2/08* (2006.01)
*B60N 2/07* (2006.01)
*B60N 2/12* (2006.01)

(52) U.S. Cl.
CPC ................ *B60N 2/08* (2013.01); *B60N 2/0715* (2013.01); *B60N 2/12* (2013.01); *B60N 2/0843* (2013.01); *B60N 2/0705* (2013.01); *B60N 2/0818* (2013.01)
USPC .......................... 248/429; 297/341; 296/65.08

(58) Field of Classification Search
USPC ..................... 248/429, 430; 296/65.08, 65.13; 297/341, 326
See application file for complete search history.

(56) References Cited

U.S. PATENT DOCUMENTS

| | | | |
|---|---|---|---|
| 5,988,751 A * | 11/1999 | Yoshida et al. ........... | 297/367 R |
| 6,945,607 B2 | 9/2005 | Kojima | |
| 7,717,490 B2 | 5/2010 | Kojima et al. | |
| 8,146,978 B2 | 4/2012 | Kojima et al. | |
| 2003/0025373 A1 | 2/2003 | Shinozaki | |
| 2004/0113473 A1 | 6/2004 | Kojima et al. | |
| 2009/0322115 A1 | 12/2009 | Yamada | |

FOREIGN PATENT DOCUMENTS

| | | |
|---|---|---|
| EP | 2 062 773 A1 | 5/2009 |
| JP | 2004-122798 | 4/2004 |
| JP | 2008-247143 | 10/2008 |

OTHER PUBLICATIONS

The Extended European Search Report issued Jul. 30, 2013, in Application No. / Patent No. 13155281.2-1758 / 2628633.
U.S. Appl. No. 13/939,663, filed Jul. 11, 2013, Nagura, et al.

\* cited by examiner

*Primary Examiner* — Anita M King
(74) *Attorney, Agent, or Firm* — Oblon, Spivak, McClelland, Maier & Neustadt, L.L.P.

(57) ABSTRACT

Provided is a vehicle seat sliding apparatus including a lower rail, an upper rail to the lower rail, a locking mechanism, unlocking mechanism, an unlocked-state maintaining lever, and an unlocked-state releasing lever, in which the unlocked-state releasing lever includes a rotational operating portion configured to rotate in a first direction and to be capable of coming into contact with an operating member in the direction of the relative movement of the upper rail, and the unlocked-state releasing lever is configured to press and move the unlocked-state maintaining lever in the direction of releasing the maintenance of the unlocked state and is capable of rotating in the first direction is disabled without moving the unlocked-state maintaining lever from the maintaining position.

7 Claims, 15 Drawing Sheets

FIG.10A
FIG.10B
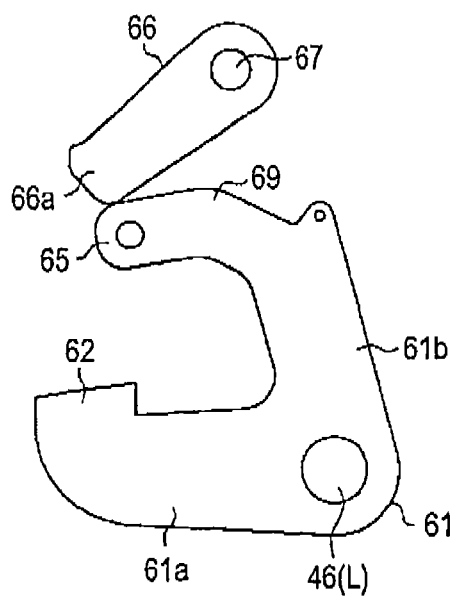
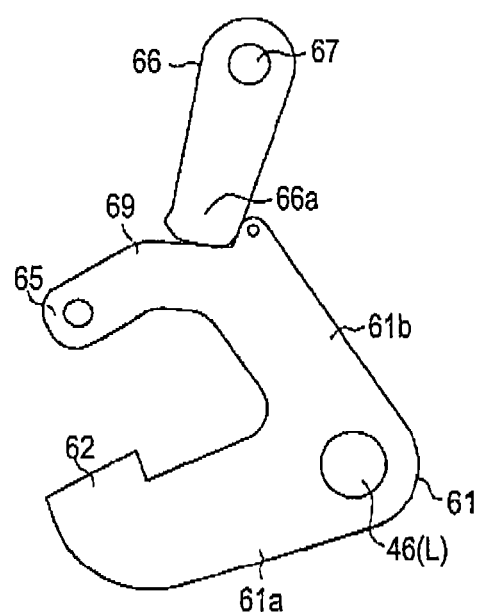

60... UNLOCKED-STATE MAINTAINING MECHANISM
66... UNLOCKED-STATE MAINTAINING LEVER
71... UNLOCKED-STATE RELEASING LEVER
74... ROTATIONAL OPERATING PORTION
P1, P2, P3... POSITION OF ROTATION

FIG.14A
FIG.14B
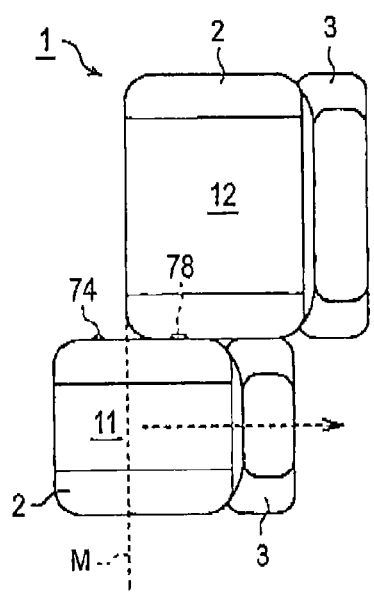
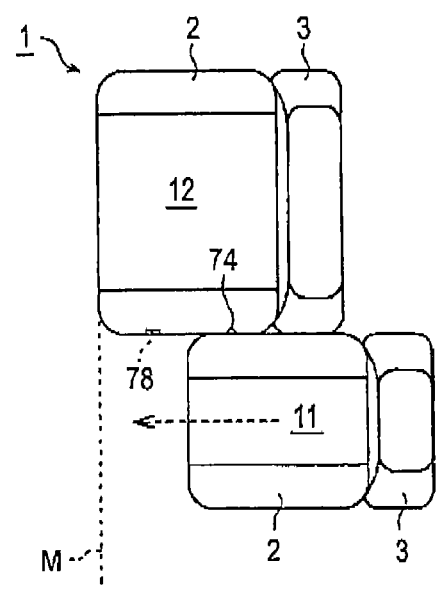

VEHICLE SEAT SLIDING APPARATUS

CROSS REFERENCE TO RELATED APPLICATIONS

This application is based on and claims priority under 35 U.S.C. §119 to Japanese Patent Application 2012-29626, filed on Feb. 14, 2012, the entire content of which is incorporated herein by reference.

TECHNICAL FIELD

This disclosure relates to a vehicle seat sliding apparatus.

BACKGROUND DISCUSSION

In general, a vehicle seat sliding apparatus includes lower rails to be fixed to a vehicle floor, upper rails to which a set is fixed and which is provided so as to be movable with respect to the lower rails, and a locking mechanism configured to be capable of restricting the relative movement of the upper rails with respect to the lower rails. The position of the seat in the fore-and-aft direction of the vehicle may be adjusted by releasing the restriction by the locking mechanism and bringing the upper rails and the lower rails into an unlocked state in which the relative movement of the upper rails with respect to the lower rails is allowed.

In the related art, there is a seat sliding apparatus including a so-called walk-in feature configured to bring the locking mechanism into an unlocked state upon a forward folding operation of a seatback, and maintain the unlocked state.

For example, the seat sliding apparatus described in JP 2004-122798A (Reference 1) includes an unlocking lever configured to cause the locking mechanism to perform an unlocking operation by being rotated in conjunction with the forward folding operation, and an unlocked-state maintaining lever configured to engage with the unlocking lever and restrict the rotation of the unlocking lever. In other words, by the restriction of the rotation of the unlocking lever at a position where the locking mechanism is caused to perform an unlocking operation, the unlocked state is maintained. In the seat sliding apparatus, a sensor bracket is provided on the lower rails, and at the time of walk-in, the unlocked-state maintaining lever comes into contact with one end of the sensor bracket by the relative movement of the upper rails with respect to the lower rails. With this contact, the engagement between the unlocked-state maintaining lever and the unlocking lever is released, and hence the maintenance of the unlocked state is released.

Here, in this related art, the sensor bracket extends along the longitudinal direction of the lower rails. The unlocked-state maintaining lever is configured to come into abutment at a distal end thereof with an upper surface of the sensor bracket at most seat positions except for a part on the front side of the vehicle by being urged to rotate. Then, at the time of the walk-in, the unlocked-state maintaining lever is moved apart from the upper surface of the sensor bracket at a seat position at the front of the vehicle, and the unlocked-state maintaining lever is rotated and engaged with the unlocking lever, so that the unlocked state is maintained.

In other words, in the general walk-in action, the seat is moved forward of the vehicle from the rear side of the vehicle. Therefore, by forming the sensor bracket so as to extend in the longitudinal direction of the lower rails, and bringing the distal end of the unlocked-state maintaining lever on the upper surface thereof as described above, the unlocked-state maintaining lever is prevented from getting stuck with the sensor bracket in a middle of the state in which the seat is moved forward of the vehicle.

By the rotation of the unlocked-state maintaining lever in association with the movement apart from the sensor bracket, the distal end of the unlocked-state maintaining lever is arranged on the lower side with respect to the upper surface of the sensor bracket. In other words, when the seat is moved rearward of the vehicle again, the distal end of the unlocked-state maintaining lever comes into contact with one end of the sensor bracket. Then, with this contact, the engagement between the unlocked-state maintaining lever and the unlocking lever is released and the maintenance of the unlocked state is released, so that the movement of the seat is restricted at the predetermined position (a fixed point).

However, with the sensor bracket extending in the longitudinal direction of the lower rails as described above, design flexibility of the seat is lowered. Then, in particular, in vehicles having a plurality of rows of seats or vehicles having long lower rails or the like, there is a problem that the length of the sensor bracket may be a significant constraint in design. In this regard, there still remains a room for improvement.

A need thus exists for a vehicle seat sliding apparatus which is not susceptible to the drawback mentioned above.

SUMMARY

In order to solve the above-described problem, according to an aspect of the embodiment disclosed here, there is provided a vehicle seat sliding apparatus comprising, a lower rail fixed to a floor of a vehicle, an upper rail to which a seat is fixed and which is provided so as to allow a relative movement with respect to the lower rail, a locking mechanism configured to be capable of restraining the relative movement of the upper rail with respect to the lower rail, unlocking mechanism configured to cause the locking mechanism to perform an unlocking operation upon a specific seat operation, an unlocked-state maintaining lever configured to maintain the locking mechanism in an unlocked state in cooperation with the unlocking mechanism by moving to a maintaining position in conjunction with the unlocking mechanism, and an unlocked-state releasing lever configured to release the maintenance of the unlocked state, in which the unlocked-state releasing lever includes a rotational operating portion configured to rotate in a first direction in conjunction with the unlocked-state maintaining lever moved to the maintaining position and to be capable of coming into contact with an operating member in the direction of the relative movement of the upper rail by the rotation thereof in the first direction, and the unlocked-state releasing lever is configured to press and move the unlocked-state maintaining lever in the direction of releasing the maintenance of the unlocked state by rotating in a second direction opposite from the first direction upon a contact between the rotational operating portion and the operating member and is capable of rotating in the first direction to a position where a rotational operation upon the contact with the operating member is disabled without moving the unlocked-state maintaining lever from the maintaining position.

BRIEF DESCRIPTION OF THE DRAWINGS

The foregoing and additional features and characteristics of this disclosure will become more apparent from the following detailed description considered with the reference to the accompanying drawings, wherein:

FIGS. 10A and 10B are explanatory drawings illustrating an operation of the unlocked-state maintaining lever;

FIGS. 14A and 14B are explanatory drawings illustrating an operation of an unlocked-state maintaining mechanism.

DETAILED DESCRIPTION

Hereinafter, an embodiment disclosed here will be explained with reference to the attached drawings.

Figure 1:
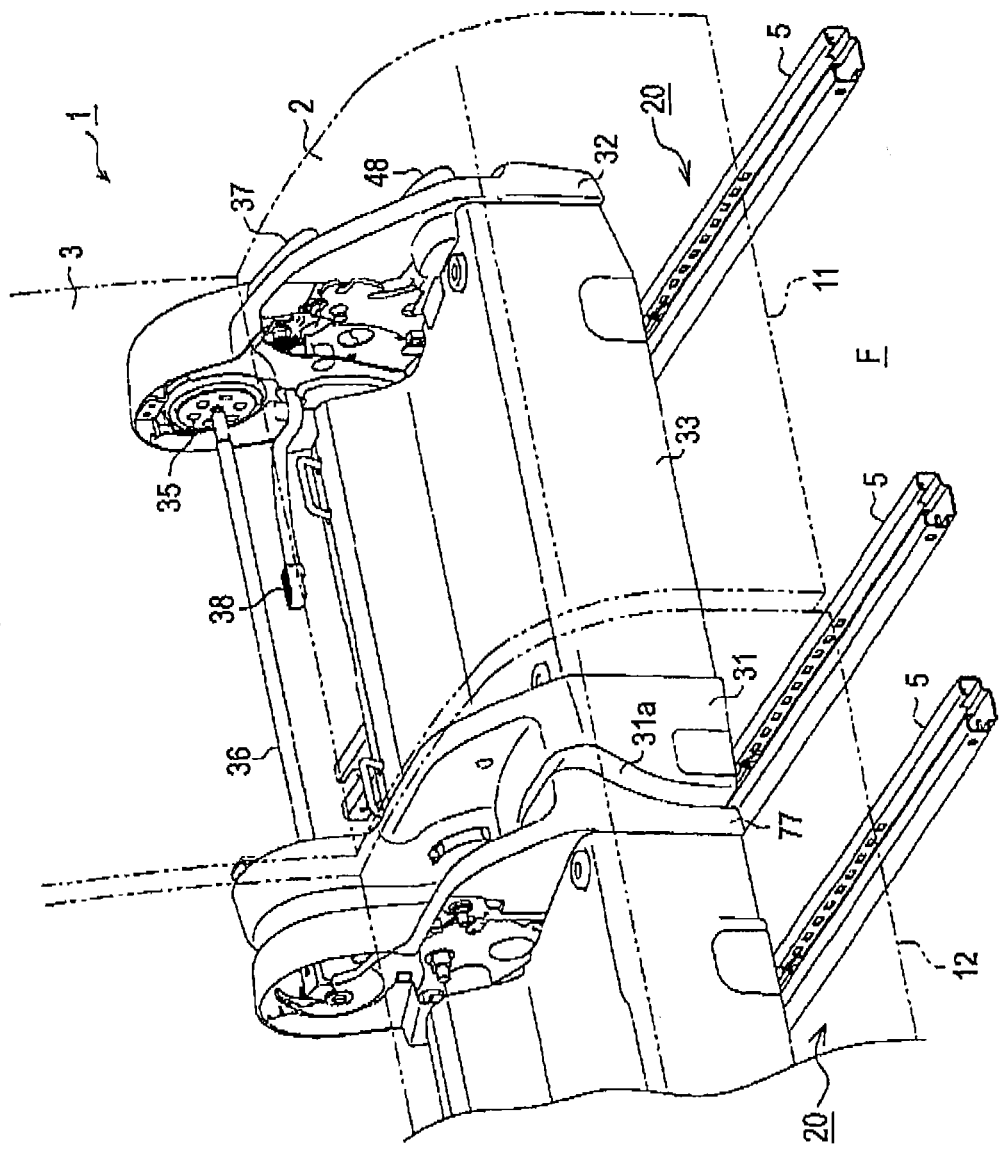
FIG. 1 is a perspective view of a seat according to an embodiment disclosed here.

As illustrated in FIG. 1, a vehicle seat 1 includes a seat cushion 2, and a seatback 3 mounted on a rear end portion of the seat cushion 2 so as to be tiltable. The seat 1 is configured as a rear seat (second row seat) which can be divided into a pair of symmetry horizontal seats 11 and 12. The respective seats 11 and 12 allow a position adjustment in the fore-and-aft direction of the vehicle and an adjustment of a tilting angle of the seatback 3 independently.

Specifically, pairs of two lower rails 5 are arranged on a floor F of the vehicle side by side at positions corresponding to the respective seats 11 and 12. In the embodiment disclosed here, a position adjustment of the seats in the fore-and-aft direction of the vehicle is enabled by a function of seat sliding apparatuses 20 provided for the respective seats 11 and 12 by the respective lower rails 5.

A basic configuration of the seat sliding apparatus 20 and a basic configuration of a seat reclining apparatus 35 described later are substantially the same for the respective seats 11 and 12. Therefore, for the sake of convenience, as regards the common portions, only the seat 11 side will be described and description of the seat 12 side will be omitted.

Figure 2:
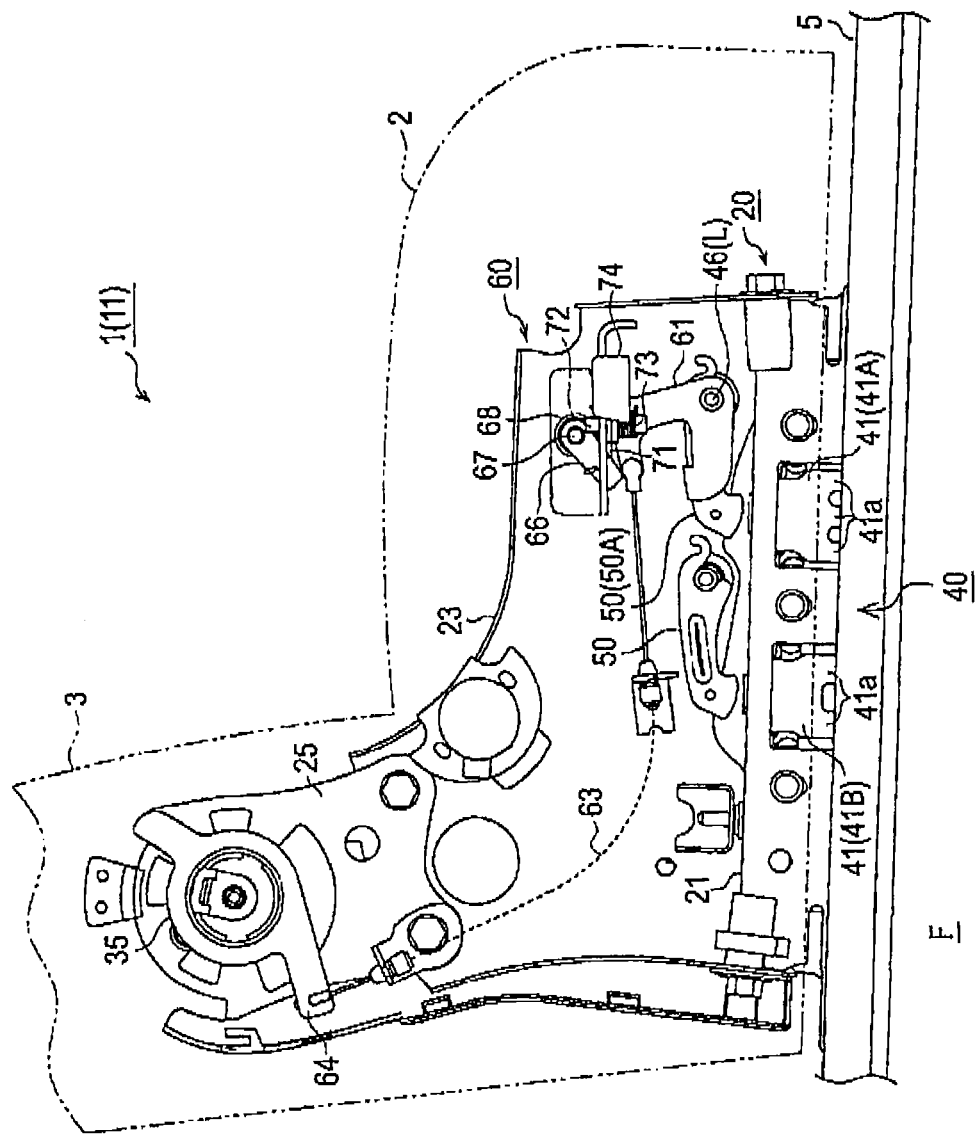
FIG. 2 is a side view of the seat.
Figure 3:
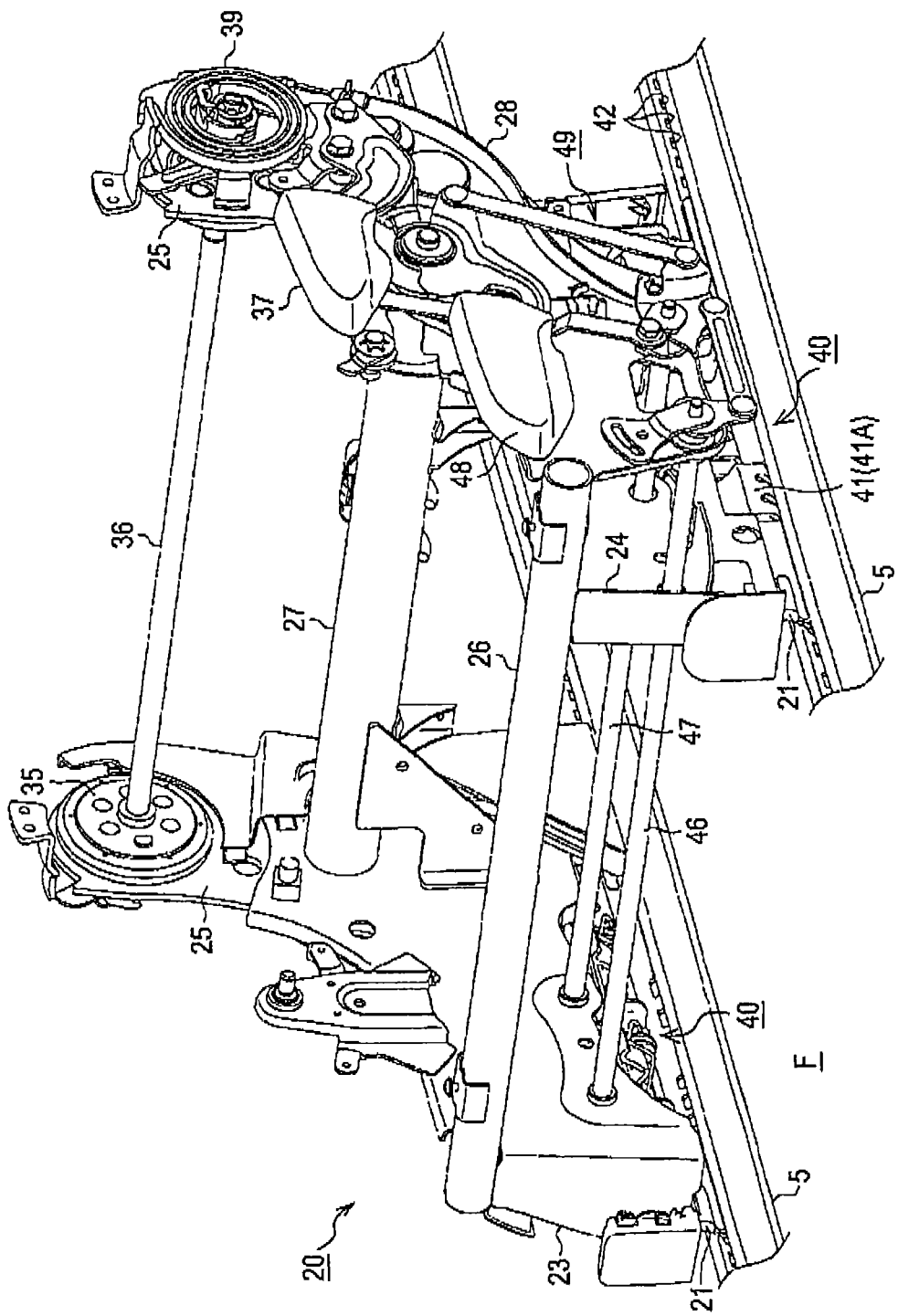
FIG. 3 is a perspective view of a seat sliding apparatus and a seat reclining apparatus.

As illustrated in FIG. 2 and FIG. 3, the seat sliding apparatus 20 includes upper rails 21 provided so as to be movable with respect to the respective lower rails 5. The seat 11 is configured to be movable on the lower rails 5 together with the upper rails 21 by being fixed to the upper rails 21.

Figure 4:
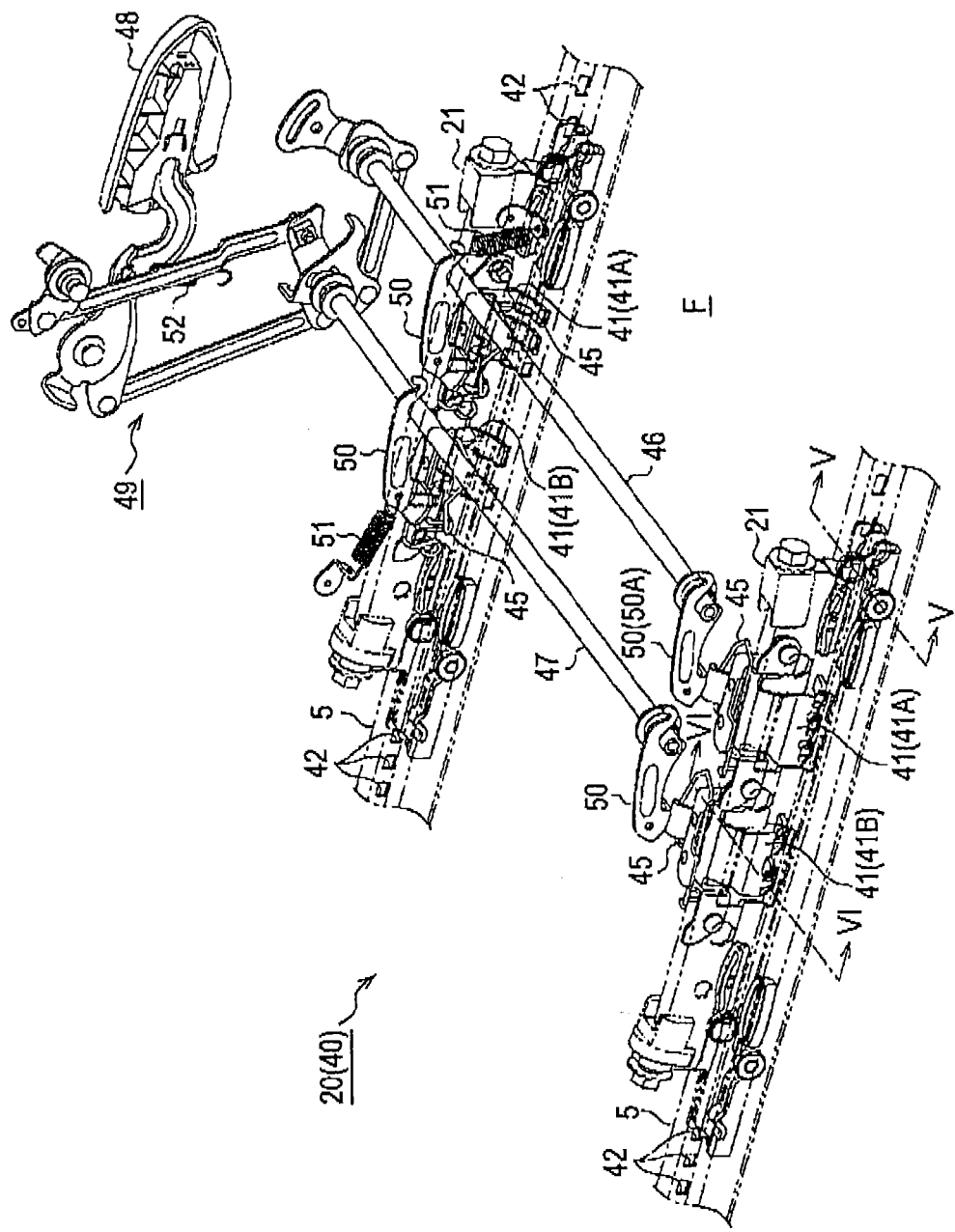
FIG. 4 is a perspective view of a locking mechanism.
Figure 5:
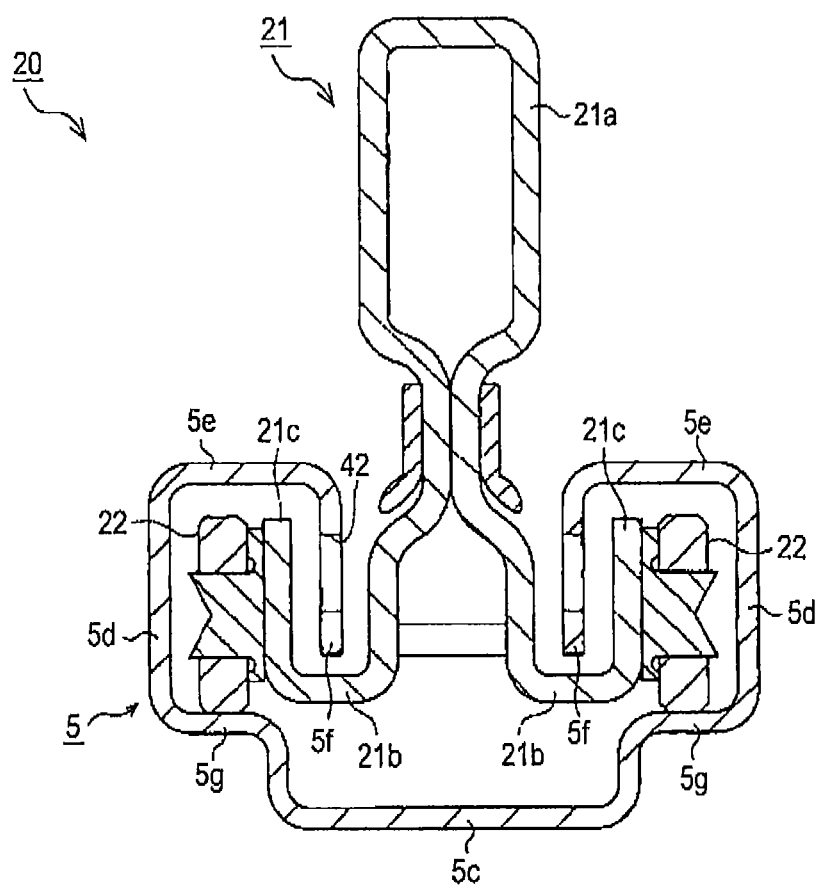
FIG. 5 is a cross-sectional view illustrating a schematic configuration of the seat sliding apparatus (a cross-sectional view taken along the line V-V)

Specifically, as illustrated in FIG. 4 and FIG. 5, the lower rails 5 each include a bottom wall portion 5c extending in the fore-and-aft direction of the vehicle (the direction orthogonal to the paper plane in FIG. 5). Outer wall portions 5d are provided at both ends in the width direction of the bottom wall portion 5c (the horizontal direction in FIG. 5) so as to extend upright therefrom, and flange-shaped upper wall portions 5e folded inward in the width direction respectively are provided at upper ends of the respective outer wall portions 5d. Then, inner wall portions 5f opposing in the width direction at a predetermined distance are formed by being folded downward respectively at distal ends of the respective upper wall portions 5e.

In contrast, the upper rails 21 each include a body portion 21a arranged between the inner wall portions 5f on the lower rail 5 side by being formed into an angular U-shape projecting upward and a pair of protruding portions 21b folded outward in the width direction from lower ends of the body portion 21a into a flange shape. The upper rails 21 also include hook portions 21c arranged in spaces surrounded by the outer wall portions 5d, the upper wall portions 5e, and the inner wall portions 5f on the lower rails 5 side, respectively, by being bent upward from distal ends of the respective protruding portions 21b. The hook portions 21c are provided with a plurality of (two each in the embodiment disclosed here) wheels 22 rotating in abutment with trajectory portions 5g provided on the bottom wall portion 5c of the lower rail 5, respectively.

In other words, the upper rails 21 of the embodiment disclosed here is allowed to move along the direction of extension of the lower rails 5 in a manner travelling on the trajectory portions 5g by the rotation of the respective wheels 22. By the arrangement of the protruding portions 21b and the hook portions 210 in the spaces surrounded by the outer wall portions 5d, the upper wall portions 5e, and the inner wall portions 5f on the side of the lower rails respectively, the relative movement of the upper rails 21 with respect to the lower rails 5 in the upward direction and in the width direction is restricted. In the embodiment disclosed here, the stability of the positional relationship between the upper rails 21 and the lower rails 5 is maintained.

As illustrated in FIG. 2 and FIG. 3, side frames 23 and 24 formed respectively into a plate shape are provided so as to extend upright on the respective upper rails 21. As illustrated in FIG. 2, the one side frame 23 is provided with a coupling portion 25 projecting upward from a rear end portion thereof (the end on the left side of the same drawing). In addition, two pipes 26 and 27 are provided between two of the side frames 23 and 24 so as to be spanned therebetween as illustrated in FIG. 3. Furthermore, a sub frame 28 is provided on the side of the other side frame 24 so as to be arranged substantially in parallel with the other side frame 24 by being fixed to distal ends of the pipes 26 and 27. The coupling portion 25 similar to that of the side frame 23 is provided at a rear end portion of the sub frame 28.

As illustrated in FIG. 1, side shields 31 and 32 are provided so as to cover the outsides of the side frame 23, the side frame 24, and the sub frame 28. A center shield 33 is also mounted in the same manner so as to cover the outsides of the pipes 26 and 27 spanned between the side frame 24 and the sub frame 28. The seat cushion 2 of the embodiment disclosed here is formed by fixing a cushion member (not illustrated) on the center shield 33.

As illustrated in FIG. 2 and FIG. 3, the seat reclining apparatuses 35 are provided at the rear end portions of the side frame 23 and the sub frame 28 respectively. Specifically, the seat reclining apparatuses 35 are provided coaxially at the respective coupling portions 25 of the side frame 23 and the sub frame 28 with a bar 36 spanned therebetween as a center of rotation thereof. Then, the seatback 3 is coupled to the seat cushion 2 via the seat reclining apparatuses 35.

The respective seat reclining apparatuses 35 of the embodiment disclosed here have a known configuration that restricts a relative rotation of the seatback 3 with respect to the seat cushion 2 and is capable of allowing the relative rotation thereof. Specifically, as illustrated in FIG. 1 and FIG. 3, the sub frame 28 includes a manual operating lever 37 projecting sideward of the side shield 32 that covers the outside thereof, and a foot pressing lever 38 projecting rearward of the seat cushion 2. As illustrated in FIG. 3, the sub frame 28 is provided with a helical spring 39, and the seatback 3 is urged in the direction of being tilted forward of the vehicle (see FIG. 2, right side) (folded forward) on the basis of a resilient force of the helical spring 39. The seat 11 accordingly is capable of adjusting the tilting angle of the seatback 3 by the operation of the operating lever 37, and folding the seatback 3 forward by the operation of the foot pressing lever 38.

The seat sliding apparatus 20 includes a locking mechanism 40 capable of restricting the relative movement of the upper rails 21 with respect to the lower rails 5 as described above, Specifically, as illustrated in FIG. 2 and FIG. 4, the upper rails 21 are provided with locking levers 41 each having a plurality of engaging claws 41a. The lower rail 5 is formed with a plurality of engaging holes 42 corresponding to the respective engaging claws 41a of the locking levers 41 along the longitudinal direction thereof. Then, the locking mechanism 40 of the embodiment disclosed here is capable of restricting the relative movement of the upper rails 21 with respect to the lower rails 5 by the engagement of the respective engaging claws 41a of the locking levers 41 with respect to the respective engaging holes 42 on the lower rails 5 side.

Figure 6:
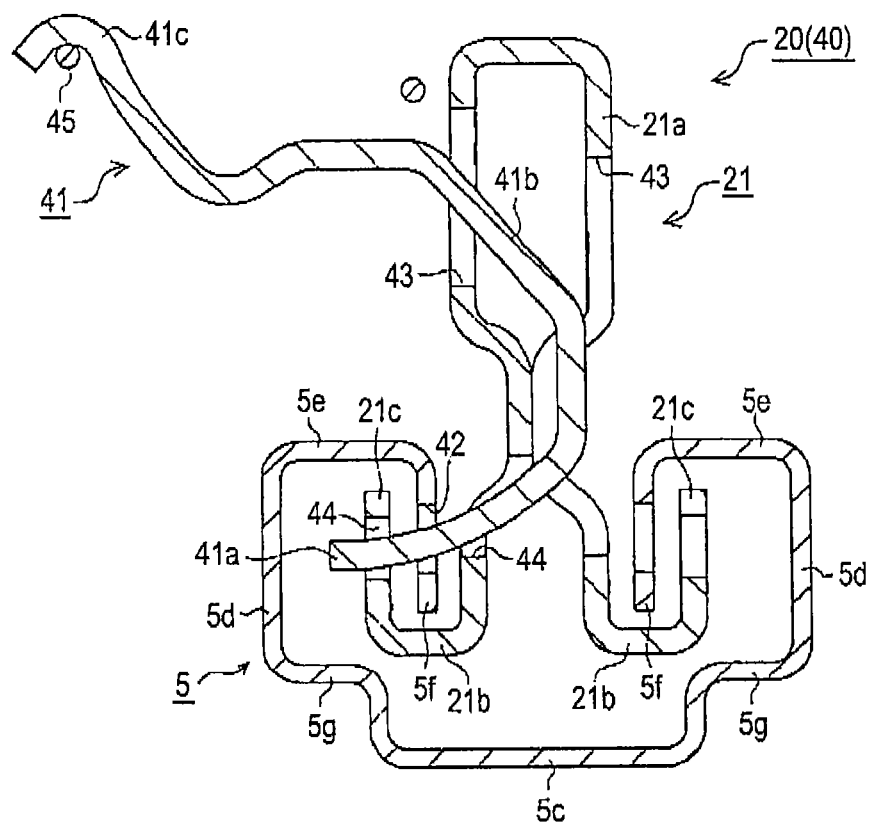
FIG. 6 is a cross-sectional view illustrating a schematic configuration of the locking mechanism (a cross-sectional view taken along the line VI-VI at the time of a locking operation)
Figure 7:
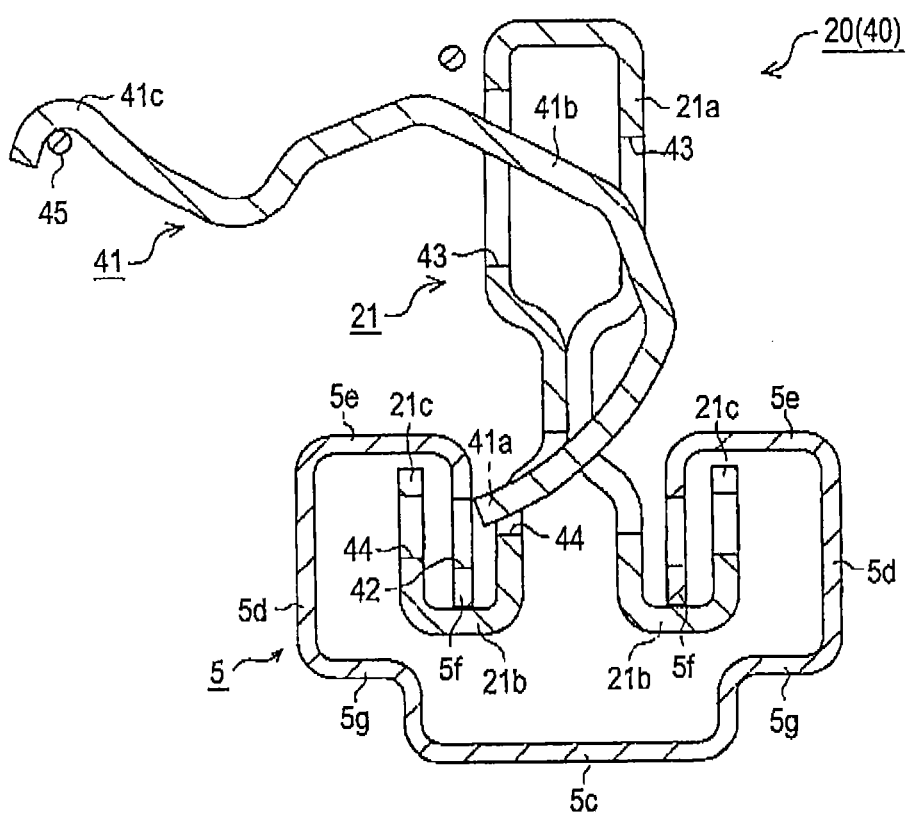
FIG. 7 is a cross-sectional view illustrating the schematic configuration of the locking mechanism (a cross-sectional view taken along the line VI-VI at the time of an unlocking operation)

More specifically, as illustrated in FIG. 6 and FIG. 7, the locking lever 41 is provided with a body portion 41b having a curved plate-shaped outline. Also, the body portion 21a of the upper rail 21 is formed with through holes 43 penetrating through (a plate member which constitutes) the body portion 21a in the width direction (horizontal direction in the respective drawings). The locking levers 41 are connected to the upper rails 21 in a state in which the body portion 41b is inserted into the through holes 43.

Specifically, the locking levers 41 each have an axis of rotation extending along the longitudinal direction of the upper rails 21 (the direction orthogonal to the paper plane in the respective drawings, not illustrated) and are rotatably coupled to the upper rails 21. A plurality of through holes 44 which allow insertion of the respective engaging claws 41a of the locking levers 41 are formed in the body portion 21a of the upper rails 21 below the through holes 43 (the lower side in the respective drawings) and the hook portions 21c, respectively. The upper rails 21 are each provided with a spring member 45 configured to urge the locking lever 41 to rotate in the direction in which the respective engaging claws 41a are inserted into the through holes 44 (clockwise direction in the respective drawings).

In other words, the locking mechanism 40 of the embodiment disclosed here is normally in a locked state in which the respective engaging claws 41a inserted into the respective through holes 44 engage with the respective engaging holes 42 on the lower rails 5 side via the through holes 44 as illustrated in FIG. 6 by the rotation of the locking levers 41 on the basis of a resilient force of the spring members 45.

The locking levers 41 of the embodiment disclosed here each include a lever portion 41c at an end portion on the opposite side from the respective engaging claws 41a, and are configured to be rotated in an unlocked direction (counterclockwise direction in the respective drawings) against the resilient force of the spring member 45 by the lever portion 41c pressed downward. Then, the locking mechanism 40 of the embodiment disclosed here may be brought into a state in which the respective engaging claws 41a are pulled out from the respective through holes 44, that is, an unlocked state in which the engagement between the respective engaging holes 42 and the respective engaging claws 41a on the lower rail 5 side is released as illustrated in FIG. 7 upon the rotation of the locking levers 41 through the pressing down of the lever portion 41c.

More specifically, as illustrated in FIG. 4, each of the upper rails 21 is provided with two locking levers 41A and 41B along the longitudinal direction thereof. Also, as illustrated in FIG. 3 and FIG. 4, a pair of rotating shafts 46 and 47 spanned between the side frame 23 and the sub frame 28 are provided above the respective locking levers 41A and 41B. In addition, the sub frame 28 is provided with a manual operating lever 48 projecting sideway of the side shield 32 and a link mechanism 49 configured to convert an operation input with respect to the operating lever 48 into the rotations of the respective rotating shafts 46 and 47 described above in the same manner as the operating lever 37 for the seat reclining. The rotating shafts 46 and 47 are provided with unlocking levers 50 respectively which rotate integrally with the respective rotating shafts 46 and 47 and press (the lever portions 41c of) the corresponding locking levers 41A and 41B respectively downward.

In other words, the respective rotating shafts 46 and 47 are rotated by a user operating (pulling upward in the embodiment disclosed here) the operating lever 48. Then, the locking mechanism 40 is brought into the unlocked state by the unlocking levers 50 provided on the respective rotating shafts 46 and 47 pressing the corresponding locking levers 41A and 41B downward.

In the embodiment disclosed here, the respective unlocking levers 50 are urged in the direction opposite from the direction in which the respective locking levers 41A and 41B are pressed downward on the basis of a resilient force of a coil spring 51 (partly omitted in the drawing), respectively. In the same manner, the operating lever 48 is also urged in the direction of movement to the position before the operation on the basis of a resilient force of a coil spring 52. In the embodiment disclosed here, the locking mechanism 40 may be brought into the locked state again by the user stopping the operation input with respect to the operating lever 48.

(Walk-In Feature)

Subsequently, a walk-in feature provided on the seat sliding apparatus of the embodiment disclosed here will be described.

As illustrated in FIG. 2, the side frame 23 of the seat 11 is provided with an unlocked-state maintaining mechanism 60 configured to be capable of causing the locking mechanism 40 to perform an unlocking operation in conjunction with the forward folding operation of the seatback 3 and maintaining the locking mechanism 40 in the unlocked state.

Figure 8:
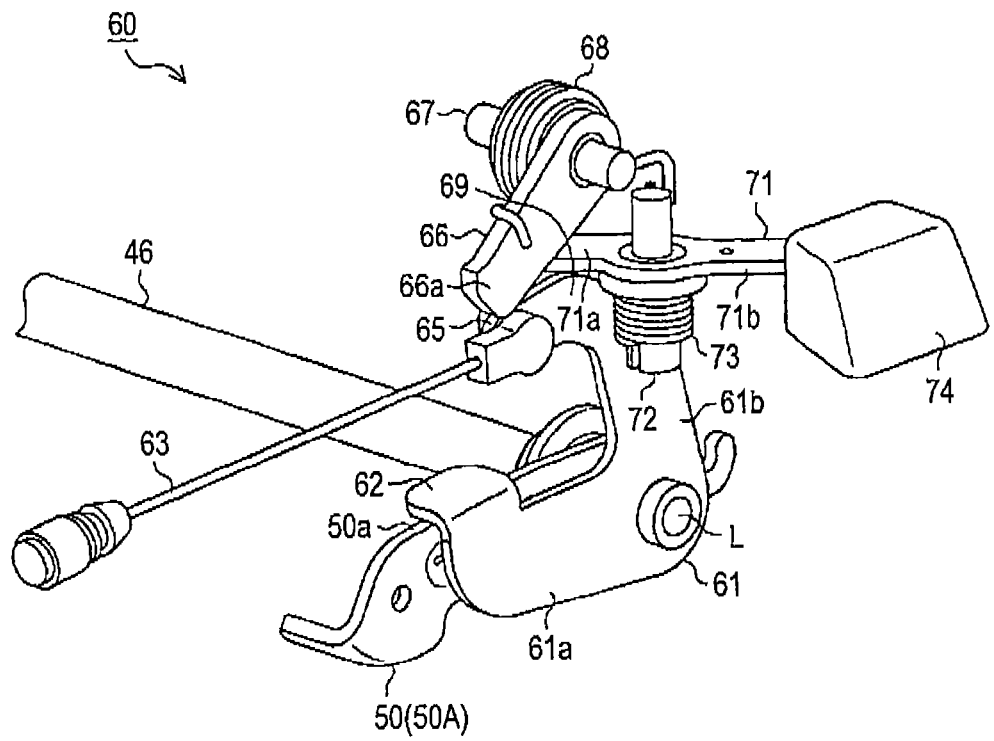
FIG. 8 is a perspective view of the unlocked-state maintaining mechanism.
Figure 9:
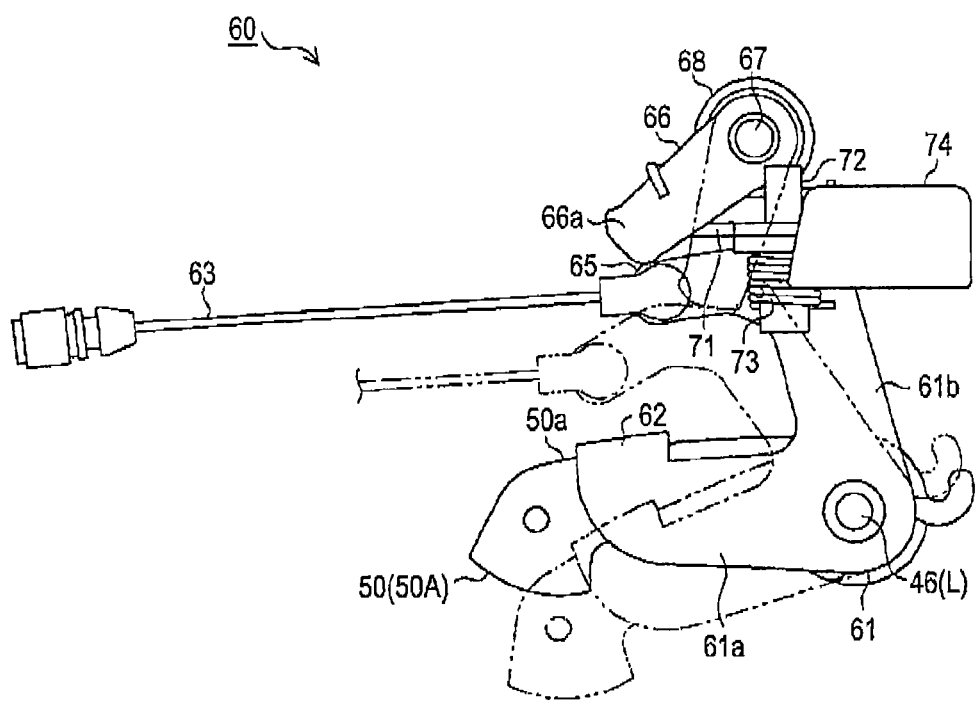
FIG. 9 is a side view of an unlocked-state maintaining mechanism.

Specifically, as illustrated in FIG. 8 and FIG. 9, the unlocked-state maintaining mechanism 60 of the embodiment disclosed here is provided with a second unlocking lever 61 having a common center of rotation L and arranged in parallel with the unlocking lever 50.

In the embodiment disclosed here, the second unlocking lever 61 is arranged in parallel to and coaxially with an unlocking lever 50A corresponding to the locking lever 41A arranged on the upper rails 21 on the side frame 23 side on the front side of the vehicle. The second unlocking lever 61 includes a pressing lever portion 61a extending along the longitudinal direction (the horizontal direction, see FIG. 9) of the unlocking lever 50A from the center of rotation L as a proximal end thereof, and a connecting lever portion 61b extending upward also from the center of rotation L as a proximal end (the upper side, see FIG. 9). A distal end of the pressing lever portion 61a is formed with a pressing flange 62 configured to be capable of coming into abutment with the upper end portion 50a of the unlocking lever 50A by being bent toward the unlocking lever 50A.

Also, as illustrated in FIG. 2, the seat reclining apparatus 35 provided on the coupling portion 25 of the side frame 23 is formed with a pulling portion 64 configured to rotate and pull a wire 63 connected to a distal end thereof upward by the seatback 3 being folded forward. Then, as illustrated in FIG. 9, a connecting portion 65 to which the other end of the wire 63 is connected is provided at a distal end of the connecting lever portion 61b configuring the second unlocking lever 61 described above.

In other words, on the basis of a pulling force of the wire 63 generated by the forward folding of the seatback 3, the second unlocking lever 61 is rotated in the direction in which the connecting lever portion 61b thereof is attracted rearward (left side in the same drawing) (counterclockwise in the same drawing). In addition, the pressing flange 62 provided at the pressing lever portion 61a presses an upper end portion 50a of the unlocking lever 50A by the rotation thereof. Then, on the basis of the pressing force, the unlocking lever 50A is rotated together with the second unlocking lever 61.

Here, as illustrated in FIG. 4, the rotation of the unlocking lever 50A is transmitted to the other unlocking lever 50 via the rotating shaft 46 on which the unlocking lever 50A is fixed, the link mechanism 49, and the rotating shaft 47 in the embodiment disclosed here. Then, the unlocked-state maintaining mechanism 60 of the embodiment disclosed here is capable of causing the locking mechanism 40 constituted by the locking levers 41 to perform the unlocking operation by the corresponding locking levers 41 (41A and 418) being pressed downward by the respective unlocking levers 50.

As illustrated in FIG. 2, FIG. 8, and FIG. 9, the unlocked-state maintaining mechanism 60 of the embodiment disclosed here is provided with an unlocked-state maintaining lever 66 provided so as to be rotatable in a state of coming into abutment with the outer periphery of the second unlocking lever 61. Then, the unlocked-state maintaining lever 66 and the second unlocking lever 61 are configured to cooperate after the locking mechanism 40 has been caused to perform the unlocking operation by the rotation of the second unlocking lever 61 to maintain the locking mechanism 40 in the unlocked state.

Specifically, as illustrated in FIG. 8 and FIG. 9, the unlocked-state maintaining lever 66 has a rotating shaft 67 arranged substantially in parallel with the center of rotation L (rotating shaft 46) of the second unlocking lever 61 above (the upper side in the respective drawings of) the second unlocking lever 61. Then, the unlocked-state maintaining lever 66 is brought into abutment at a distal end portion 66a thereof with the outer periphery of the second unlocking lever 61 by being urged (urged counterclockwise in FIG. 9) by a torsion coil spring 68 fitted onto the rotating shaft 67.

Here, as illustrated in FIGS. 10A and 10B, the connecting lever portion 61b which constitutes the second unlocking lever 61 is formed with a hook-shaped bent portion (a hook portion 69). Then, the distal end portion 66a of the unlocked-state maintaining lever 66 is brought into abutment with the vicinity of the hook portion 69.

Specifically, as illustrated in FIG. 10A, in a state before the second unlocking lever 61 is rotated on the basis of the pulling force of the wire 63, the distal end portion 66a of the unlocked-state maintaining lever 66 comes into abutment with the distal end side (the connecting portion 65 side) with respect to the hook portion 69. Then, as illustrated in FIG. 10B, in a state in which the second unlocking lever 61 is rotated until the position where the locking mechanism 40 is caused to perform the unlocking operation, the distal end portion 66a of the unlocked-state maintaining lever 66 comes into abutment with the proximal end side (the center of rotation L side) with respect to the hook portion 69.

In other words, a point of abutment of the unlocked-state maintaining lever 66 with respect to the second unlocking lever 61 apparently moves from the distal end side to the proximal end side on the outer periphery of the connecting lever portion 61b by the rotation of the unlocked-state maintaining lever 66 in conjunction with the second unlocking lever 61.

In the embodiment disclosed here, by the movement of the paint of abutment therebetween to the proximal end side with respect to the hook portion 69 in this manner, the distal end portion 66a of the unlocked-state maintaining lever 66 engages with the hook portion 69. Then, in this manner, by the restriction of the rotation of the second unlocking lever 61, the locking mechanism 40 may be maintained in the unlocked state.

The unlocked-state maintaining mechanism 60 is provided with an unlocked-state releasing lever 71 configured to release the maintenance of the unlocked state by the unlocked-state maintaining lever 66.

An illustrated in FIG. 8 and FIG. 9, the unlocked-state releasing lever 71 includes a rotating shaft 72 extending in the vertical direction (the vertical direction in the respective drawings) at a position twisted with respect to the rotating shaft 67 of the unlocked-state maintaining lever 66. Then, the unlocked-state releasing lever 71 includes an action bar 71a and an operating bar 71b extending linearly from the rotating shaft 72 as a proximal end in the directions substantially opposite from each other.

Specifically, the action bar 71a and the operating bar 71b are each formed into a substantially elongated plate shape. A torsion coil spring 73 is fitted on the rotating shaft 72. The unlocked-state releasing lever 71 is configured to cause the action bar 71a thereof to come into abutment with the distal end portion 66a of the unlocked-state maintaining lever 66 from the front side of the vehicle (the right side in FIG. 9) by being urged by the torsion coil spring 73.

In contrast, a resin-made rotational operating portion 74 formed into a cubic shape is mounted on a distal end of the operating bar 71b. Then, the unlocked-state releasing lever 71 of the embodiment disclosed here is configured to be capable of rotating in the direction corresponding to the direction of contact upon the contact of an operating member with respect to the rotational operating portion 74.

Figure 11:
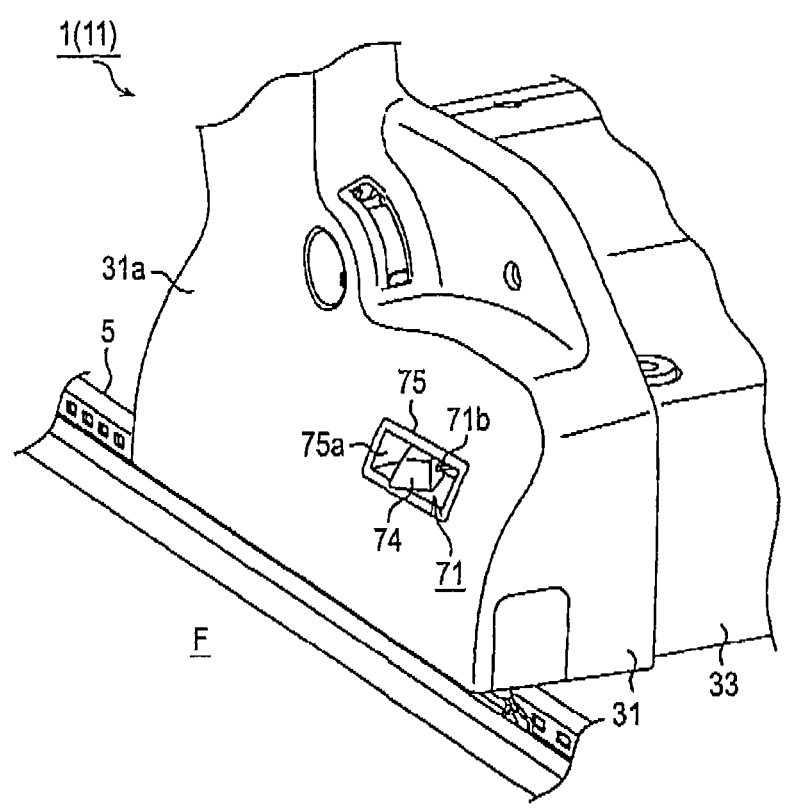
FIG. 11 is a perspective view illustrating a side surface of the seat.

As illustrated in FIG. 11, a storage cover 75 configured to be capable of storing the rotational operating portion 74 provided at the distal end of the operating bar 71b without impairing the rotation of the unlocked-state releasing lever 71 is provided on the side shield 31 which surrounds the outside of the side frame 23 and the unlocked-state maintaining mechanism 60. The storage cover 75 includes an opening 75a on a side surface 31a of the side shield 31. Then, in the embodiment disclosed here, the rotational operating portion 74 provided at the distal end of the operating bar 71b is configured to project sideways of the side shield 31 from the opening 75a of the storage cover 75 upon the rotation of the unlocked-state releasing lever 71.

Figure 12:
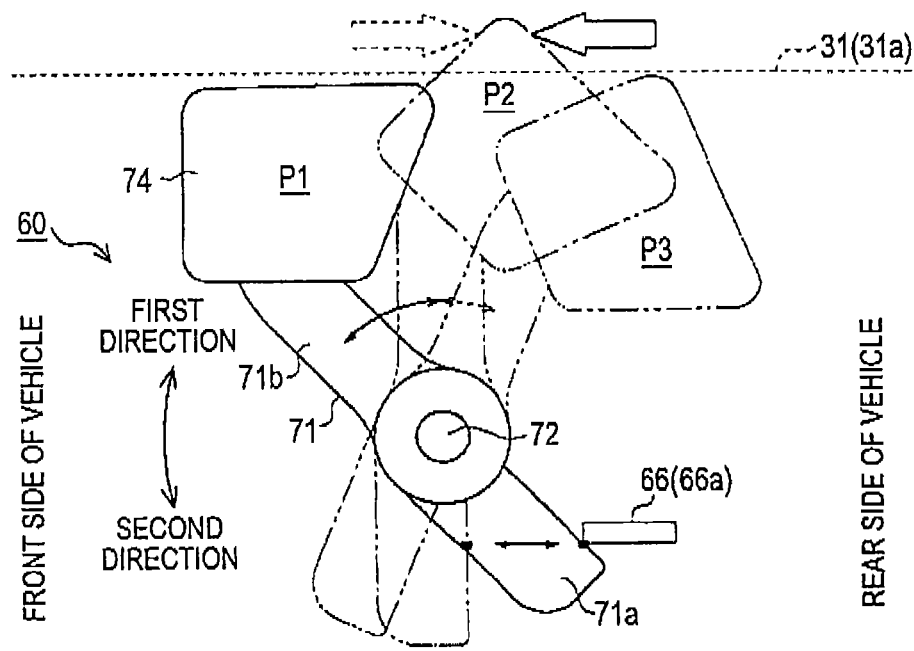
FIG. 12 is an explanatory drawing illustrating an operation of an unlocked-state releasing lever.

Specifically, as illustrated in FIG. 12, the point of abutment between the unlocked-state maintaining lever 66 and (the action bar 71a of) the unlocked-state releasing lever 71 moves in the fore-and-aft direction of the vehicle (the horizontal direction in the same drawing) upon the rotation of the unlocked-state maintaining lever 66.

In other words, as described above, the unlocked-state maintaining lever 66 is rotated in conjunction with the rotation of the second unlocking lever 61 (see FIGS. 10A and 10B), and the distal end portion 66a which comes into abutment with the second unlocking lever 61 so as to move forward of the vehicle (the left side in FIG. 12). Then, the unlocked-state releasing lever 71 is configured to cause the action bar 71a thereof to come into abutment with the distal end portion 66a of the unlocked-state maintaining lever 66 from the front side of the vehicle by being urged by the torsion coil spring 73.

Therefore, with the movement of the distal end portion 66a of the unlocked-state maintaining lever 66 forward of the vehicle, the unlocked-state releasing lever 71 is rotated in the direction in which the action bar 71a as the point of abutment thereof moves forward of the vehicle (counterclockwise in the drawing).

In other words, in the embodiment disclosed here, the direction of rotation of the unlocked-state releasing lever 71 in which the action bar 71a moves forward of the vehicle in this manner is referred to as a "first direction", and the direction of rotation opposite from the first direction is referred to as a "second direction".

The unlocked-state releasing lever 71 of the embodiment disclosed here is configured in such a manner that the rotational operating portion 74 provided on the operating bar 71b is entirely stored in the storage cover 75 in a state before rotating in the first direction in this manner, that is, at a position of rotation P1 before the unlocked-state maintaining lever 66 moves to a maintaining position in conjunction with the second unlocking lever 61. Then, the rotational operating portion 74 is configured to project sideways of the side shield 31 from the opening 75a of the storage cover 75 by the rotation of the unlocked-state releasing lever 71 in conjunction with the unlocked-state maintaining lever 66 in abutment therewith.

In other words, the unlocked-state releasing lever 71 of the embodiment disclosed here is configured in such a manner that the operating member does not come into contact with the rotational operating portion 74 in a state before the locking mechanism 40 performs the unlocking operation by the walk-in feature upon the forward folding operation of the seatback 3.

However, by the rotation of the unlocked-state releasing lever 71 in the first direction in conjunction with the unlocked-state maintaining lever 66 moving to the maintaining position, the rotational operating portion 74 is exposed from the external surface of the storage cover 75. Then, accordingly, the unlocked-state releasing lever 71 of the embodiment disclosed here is configured in such a manner that the operating member may come into contact with the rotational operating portion 74 in the fore-and-aft direction of the vehicle in which the seat 11 moves, that is, in the direction of relative movement of the upper rails 21 with respect to the lower rails 5.

Specifically, the unlocked-state releasing lever 71 is rotated in the first direction to a position of rotation P2 corresponding to a state in which the unlocked-state maintaining lever 66 is moved to the maintaining position in association with the unlocking operation by the walk-in feature (see FIG. 10B).

Also, when the operating member comes into contact with the rotational operating portion 74 projecting from the opening 75a of the storage cover 75 from the rear side of the vehicle (the right side in the same drawing), the unlocked-state releasing lever 71 is rotated in the direction in which the action bar 71a moves rearward of the vehicle, that is, in the second direction. Then, the unlocked-state maintaining mechanism 60 of the embodiment disclosed here has a configuration in which the maintenance of the unlocked state by the unlocked-state maintaining lever 66 is released upon the rotation of the unlocked-state releasing lever 71 in the second direction.

In other words, by the rotation of the unlocked-state releasing lever 71 in the second direction, the unlocked-state maintaining lever 66 is pressed rearward of the vehicle by the action bar 71a coming into abutment therewith. Then, by the rotation of the unlocked-state maintaining lever 66 on the basis of the pressing force, and the release of the engagement between the distal end portion 66a and the hook portion 69 of the second unlocking lever 61, the locking mechanism 40 is restored to the locked state.

In addition, when there is an input of an external force resisting a resilient force of the torsion coil spring 73 (contact of the operating member) with respect to the rotational operating portion 74, the unlocked-state releasing lever 71 of the embodiment disclosed here is capable of rotating further in the first direction beyond the position of rotation P2 corresponding to the state in which the unlocked-state maintaining lever 66 is moved to the maintaining position.

Specifically, the unlocked-state releasing lever 71 is rotated in the first direction in a mode in which the rotational operating portion 74 provided at the distal end of the operating bar 71b is immersed into the storage cover 75. At this time, the action bar 71a of the unlocked-state releasing lever 71 moves apart from the unlocked-state maintaining lever 66. In other words, the unlocked-state maintaining lever 66 also in this state is at a maintaining position at which the unlocked state can be maintained on the basis of the engagement between the distal end portion 66a and the hook portion 69 of the second unlocking lever 61 (see FIG. 10B). Then, the unlocked-state maintaining mechanism 60 of the embodiment disclosed here is configured to rotate the unlocked-state releasing lever 71 in the first direction until a position of rotation P3 where the rotational operation upon the contact of the operating member with respect to the rotational operating portion 74 is disabled while maintaining the locking mechanism 40 in the unlocked state.

Figure 13:
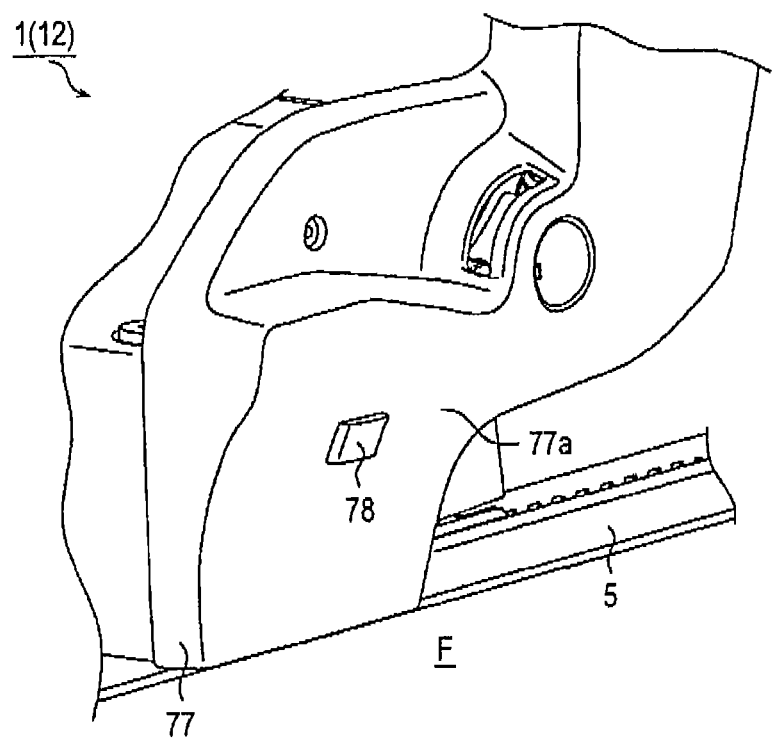
FIG. 13 is a perspective view illustrating a side surface of a next seat.

As illustrated in FIG. 1 and FIG. 13, in the embodiment disclosed here, an operating projection 78 projecting toward the side shield 31 from a side surface 77a on the seat 11 side is provided on a side shield 77 of the seat 12 next to the seat 11.

Specifically, the operating projection 78 is provided at a position corresponding to the opening 75a of the storage cover 75 provided on the side surface 31a of the side shield 31 as described above. Specifically, the operating projection 78 is set to be at a position equal to the position of the opening 75a in the direction of the height of the seat (the vertical direction in FIG. 2). Then, the operating projection 78 is set to be arranged at a slightly front side of the vehicle of the opening 75a on the seat 11 side when two of the seats 11 and 12 are arranged side by side at the same position in the fore-and-aft direction of the vehicle (see FIG. 1).

In other words, the unlocked-state maintaining mechanism 60 of the embodiment disclosed here is configured in such a manner that the operating projection 78 as the operating member comes into contact with the rotational operating portion 74 upon the movement of the seat 11 in the fore-and-aft direction of the vehicle. Accordingly, by the rotation of the unlocked-state releasing lever 71 in the second direction, the maintenance of the unlocked state can be released.

Subsequently, an action of the unlocked-state maintaining mechanism of the embodiment disclosed here configured as described above will be described.

As illustrated in FIG. 14A, the seat 11 maintained in the unlocked state by the walk-in feature is moved forward of the vehicle (the leftward in the same drawing). Thereafter, in many cases, the seat 11 is returned back to a position aligned to the next seat 12 (a position where distal ends of both seats are aligned in the fore-and-aft direction of the vehicle shown by a broken line M in the same drawing).

In the embodiment disclosed here, the rotational operating portion 74 projecting sideways of the seat 11 by a seat sliding operation at this time comes into contact with the operating projection 78 provided on the next seat 12. In other words, when the seat 11 is moved rearward of the vehicle, the rotational operating portion 74 comes into contact with the operating projection 78 on the seat 12 side. Therefore, the unlocked-state releasing lever 71 is operated so as to rotate relatively in the second direction (see FIG. 12, the rotational operation shown by an arrow in a solid line in the same drawing). Then, maintenance of the unlocked state is released by this rotational operation, and hence the seat 11 is fixed to a position aligned with the next seat 12.

As illustrated in FIG. 14B, a case where the seat 11 is located on the rear side of the vehicle with respect to the next seat 12 (the right side in the same drawing) when using the walk-in feature is supposed. Then, in such a case, the rotational operating portion 74 projecting sideways of the seat 11 by the seat sliding operation forward of the vehicle comes into contact with the operating projection 78 provided on the next seat 12 from the rear side of the vehicle.

However, in the embodiment disclosed here, this contact causes the unlocked-state releasing lever 71 to further rotate in the first direction (the clockwise direction in the drawing) (see FIG. 12, the rotational operation shown by the arrow in a broken line in the same drawing). Then, by rotating the unlocked-state releasing lever 71 to a position where the rotating operation upon the contact is disabled (see FIG. 12, the position of rotation P3), the seat 11 may be moved smoothly forward of the vehicle without being caught at the rotational operating portion 74 by the operating projection 78 on the seat 12 side.

As described above, according to the embodiment disclosed here, the following effects are achieved.

(1) The unlocked-state releasing lever 71 is rotated in the first direction in conjunction with the unlocked-state maintaining lever 66 moving to the maintaining position, and includes the rotational operating portion 74 configured to allow the operating member to come into contact therewith in the direction of relative movement of the upper rails by the rotation of the unlocked-state releasing lever 71 in the first direction. The unlocked-state releasing lever 71 is also configured to be capable of pressing and moving the unlocked-state maintaining lever 66 in the direction of releasing the maintenance of the unlocked state by the rotation in the second direction opposite from the first direction upon the contact between the rotational operating portion 74 and the operating member. Then, the unlocked-state releasing lever 71 is configured to be capable of rotating the unlocked-state maintaining lever 66 further in the first direction to a position where the rotational operation is disabled upon the contact with the operating member without moving the unlocked-state maintaining lever 66 from the maintaining position.

In the configuration described above, the maintenance of the unlocked state at a position where the operating member thereof comes into contact with the rotational operating portion 74 may be released by setting the operating member which comes into contact with the rotational operating portion 74 by the relative movement of the upper rails 21 with respect to the lower rails 5, that is, by the seat sliding operation. Then, the interference between the both is avoided by rendering the operating member incapable of coming into contact with the rotational operating portion 74 except when the unlocked state is maintained by the operation of the unlocked-state maintaining lever 66. When the operating member comes into contact with the rotational operating portion 74 by the seat sliding operation in the direction opposite from that in the case where the maintenance of the unlocked state is released, the unlocked-state releasing lever 71 is rotated to a position where the rotational operation is disabled upon the contact with the operating member without moving the unlocked-state maintaining lever 66 from the maintaining position. Then, accordingly, the rotational operating portion 74 may be avoided from being caught by the operating member in the course of the seat sliding operation by the walk-in feature. Consequently, the walk-in feature is secured without depending on the shape of the operating member. Accordingly, higher design flexibility is secured including the mode of restoration from the unlocked state (release of maintenance) on the basis of the setting of the operating member.

(2) The unlocked-state maintaining lever 66 is provided so as to be rotatable at a position where the distal end portion 66a thereof intersects the action bar 71a of the unlocked-state releasing lever 71. The unlocked-state releasing lever 71 is also urged in the second direction by the torsion coil spring 73. Accordingly, the action bar 71a comes into abutment with the unlocked-state maintaining lever 66.

In the configuration described above, the unlocked-state releasing lever 71 may be rotated in conjunction with the unlocked-state maintaining lever 66 on the basis of the resilient force of the torsion coil spring 73. Then, when there is an input of the external force resisting the resilient force of the torsion coil spring 73 (contact of the operating member) with respect to the rotational operating portion 74 of the unlocked-state releasing lever 71, the unlocked-state releasing lever 71 may be rotated in the first direction without the operation of the unlocked-state maintaining lever 66 already at the maintaining position.

(3) The second unlocking lever 61 causes the locking mechanism 40 to perform the unlocking operation upon the forward folding of the seatback 3. Accordingly, the walk-in feature may be used by the same operation as many seat sliding apparatuses.

(4) The unlocked-state releasing lever 71 is configured in such a manner that the rotational operating portion 74 provided at the distal end of the operating bar 71b projects sideways of the side shield 31 when the unlocked-state releasing lever 71 is rotated in the first direction in conjunction with the unlocked-state maintaining lever 66 moving to the maintaining position.

In the configuration described above, the operating member may be set to a given position capable of coming into contact with the rotational operating portion 74 on the side of the seat 11. With the existence of the rotational operating portion 74 on the side of the seat 11, the unlocked-state releasing lever 71 may be operated manually by a passenger of the vehicle. For example, in recent years, the number of vehicles which allow various seat position changes (seat arrangements) increases. In such vehicles, a situation in which the seat 11 cannot be moved to a position where the operating member is set may occur depending on the seat position. However, In the configuration described above, the seat 11 may be fixed after the maintenance of the unlocked state has been released by the manual operation in such a situation. Consequently, the convenience of the user may be improved.

(5) The (side shield 77 of the) next seat 12 arranged on the side of the seat 11 is provided with the operating projection 78 as the operating member. In the configuration described above, the maintenance of the unlocked state at a position aligned with the next seat 12 is released and the seat 11 can be fixed at that position. Consequently, the convenience of the user may be improved.

The embodiment disclosed here may be modified as follows.

The embodiment disclosed here is described as the seat 1 configured as a rear seat (second row seat) which can be divided into a pair of symmetry left and right seats 11 and 12. However, the embodiment disclosed here is not limited thereto and may be applied to a driver's seat or a front passenger seat, or may be applied to rear seats from the third row onward.

In the embodiment disclosed here, the locking mechanism 40 includes two each of the locking levers 41A and 41B provided on the respective upper rails 21 along the longitudinal direction thereof. However, this disclosure is not limited thereto, and, for example, the number of the locking levers 41 may be changed as needed such as one each on the respective upper rails 21. The shape or the movement of the locking levers 41 may be changed as needed.

In the embodiment disclosed here, the second unlocking lever 61 is rotated on the basis of the tensile force of the wire 63 generated by the forward folding of the seatback 3. Then, the unlocking lever 50 (50A) is rotated with the second unlocking lever 61 and, in addition, the respective locking levers 41 (41A) corresponding thereto are pushed downward, so that the locking mechanism 40 performs the unlocking operation. However, the configuration of the unlocking means is not limited thereto, and may be changed as needed.

Specifically, the locking mechanism 40 may be configured to perform the unlocking operation upon the specific seat operation instead of the forward folding operation of the seatback 3. For example, a configuration in which input means (an operating lever or a switch or the like) which allows the passenger to operate is provided to cause the locking mechanism 40 to perform the unlocking operation and maintain the unlocked state, and the locking mechanism 40 is caused to perform the unlocking operation on the basis of the operation input thereto is also applicable. Therefore, in this case, the seatback 3 does not necessarily have to be a forward folded state as in the case of the normal walk-in feature.

In the embodiment disclosed here, the unlocked-state maintaining lever 66 is provided in such a manner that the distal end portion 66a thereof is rotatable at a position intersecting the action bar 71a of the unlocked-state releasing lever 71 by the rotation of the unlocked-state releasing lever 71. However, the configuration of the unlocked-state maintaining lever 66 is not limited thereto, and may be changed as needed as long as the locking mechanism 40 may be maintained in the unlocked state in conjunction with the unlocking means by the movement of the unlocked-state maintaining lever 66 to the maintaining position in conjunction with the unlocking means, and also may be moved in the direction of releasing the maintenance of the unlocked state thereof by being pressed by the unlocked-state releasing lever 71. For example, the operation at the time of movement to the maintaining position does not necessarily have to be the rotation, but may be other actions such as swinging. The shape of the unlocked-state maintaining lever 66 may also be changed as arbitrarily.

In the embodiment disclosed here, as illustrated in FIG. 8, the rotating shaft 46 which serves as the center of rotation L of the second unlocking lever 61 extends in the direction substantially orthogonal to two of the upper rails 21. The unlocked-state maintaining lever 66 has the rotating shaft 67 arranged substantially in parallel to the center of rotation L. Then, the unlocked-state releasing lever 71 includes the rotating shaft 72 extending in the vertical direction at a position twisted with respect to the rotating shaft 67 of the unlocked-state maintaining lever 66. However, the unlocked-state releasing lever 71 is not limited thereto and, for example, the direction of extension of (the rotating shaft 67) of the unlocked-state maintaining lever 66 and (the rotating shaft 72) of the unlocked-state releasing lever 71 may be changed by changing the arrangement of the unlocked-state maintaining mechanism 60.

In other words, in the embodiment disclosed here, the direction of rotation in which the action bar 71a moves forward of the vehicle is referred to as the "first direction", and the direction of rotation opposite from the first direction is referred to as the "second direction", However, the direction of the "first direction" in this case is not limited thereto.

In the embodiment disclosed here, the unlocked-state releasing lever 71 is configured in such a manner that the rotational operating portion 74 projects sideways of the seat 11 (the side shield 31) of the storage cover 75 by the rotation in the first direction. The (side shield 77 of the) next seat 12 arranged on the side of the seat 11 is provided with the operating projection 78 as the operating member. However, this disclosure is not limited thereto and, for example, a configuration in which the operating member is set to a fixed portion of the vehicle where the relative position with respect to the upper rails 21 changes by the relative movement of the upper rails 21 with respect to the lower rails 5, such as the floor F, the lower rails 5 of the vehicle, or an inner wall of a cabin is also applicable.

Figure 15:
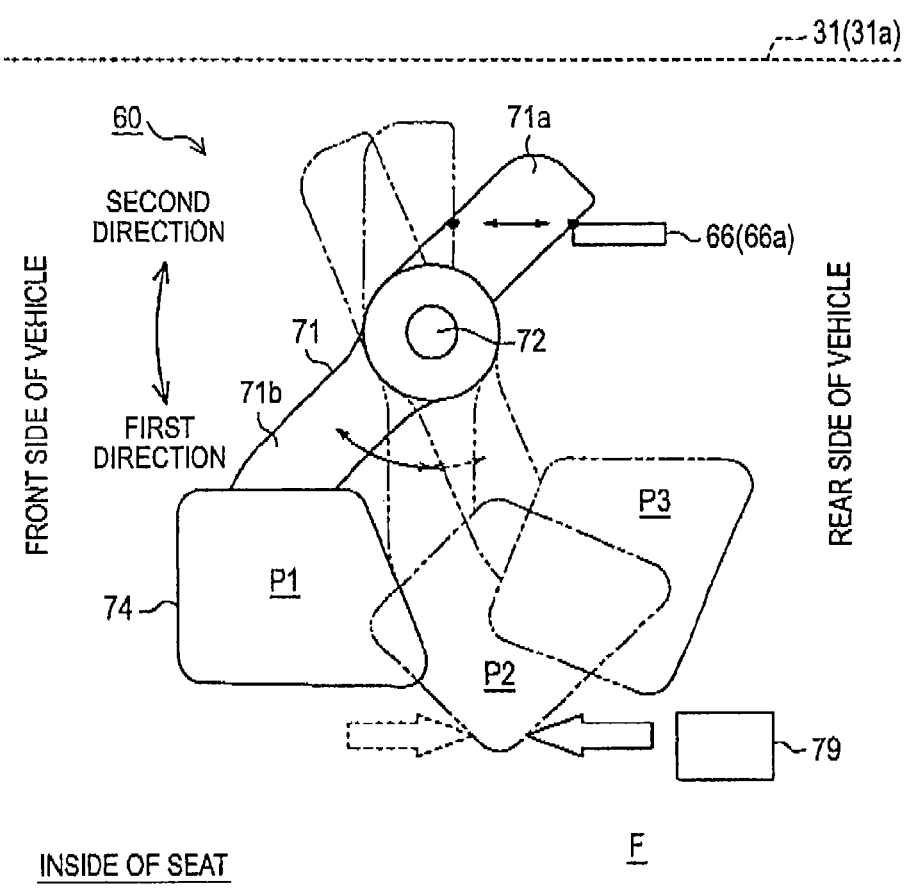
FIG. 15 is a schematic drawing illustrating a schematic configuration of the unlocked-state maintaining mechanism of another example.

For example, as illustrated in FIG. 15, the unlocked-state releasing lever 71 is arranged so that the operating bar 71b and the rotational operating portion 74 extend inward of the seat (the lower side in the same drawing, see FIG. 1, the inner side of the side shield 31). An operation projection 79 as an operating member is provided on the floor F of the vehicle as the fixed portion. Then, the operation projection 79 may be configured so as to come into contact with the rotational operating portion 74 by the seat sliding operation.

As the structure for bringing the both into contact with each other, an arrangement of the operation projection 79 on a trajectory of the rotational operating portion 74 in association with the relative movement of the upper rails 21 or, alternatively, an arrangement of the rotational operating portion 74 in the vicinity of the floor F by bending the operating bar 71b is applicable, for example. Then, the operating member only have to be capable of coming into contact with the rotational operating portion 74 in the direction of relative movement of the upper rail by the rotation of the unlocked-state releasing lever 71 in the first direction in conjunction with the unlocked-state maintaining lever 66 moving to the maintaining position.

In the configuration described above, the maintenance of the unlocked state is released with the position where the operation projection 79 and the rotational operating portion 74 come into contact with each other as a fixed point, so that the seat 11 may be fixed at that position. In the same manner as the embodiment disclosed here, the interference between the both is avoided by rendering the operation projection 79 as the operating member incapable of coming into contact with the rotational operating portion 74 except when the unlocked state is maintained. Then, by securing the rotation of the unlocked-state releasing lever 71 in the first direction without moving the unlocked-state maintaining lever 66 which is already at the maintaining position, the rotational operating portion 74 may be avoided from being caught by the operating member in the course of the seat sliding operation by the walk-in feature. Consequently, higher design flexibility may be secured while securing the walk-in feature.

Furthermore, in the modification, the rotational operating portion 74 is prevented from being exposed to an outer surface of the seat 11 (including the side surface 31*a* of the side shield 31 and an upper surface portion or the like of the seat 11, not illustrated). Accordingly, by avoiding the contact of the passenger with the rotational operating portion 74, for example, an effect such that occurrence of malfunction may be restrained is achieved.

In the embodiment disclosed here, the unlocked-state releasing lever 71 is urged in the second direction with the torsion coil spring 73 fitted on the rotating shaft 72 as a resilient member. However, the resilient member is not limited thereto, and resilient members other than the torsion coil spring such as a leaf spring may be employed.

In the embodiment disclosed here, the respective seats 11 and 12 are each provided with a set of two lower rails 5 (and the upper rails 21). However, the number of the rails is not limited thereto, and may be one or three or more for each seat.

Therefore, aspects of this disclosure are further described below.

According to a first aspect of the embodiment disclosed here, there is provided a vehicle seat sliding apparatus including: a lower rail fixed to a floor of a vehicle; an upper rail to which a seat is fixed and which is provided so as to allow a relative movement with respect to the lower rail; a locking mechanism configured to be capable of restraining the relative movement of the upper rail with respect to the lower rail; unlocking mechanism configured to cause the locking mechanism to perform an unlocking operation upon a specific seat operation; an unlocked-state maintaining lever configured to be capable of maintaining the locking mechanism in an unlocked state in cooperation with the unlocking mechanism by moving to a maintaining position in conjunction with the unlocking mechanism; and an unlocked-state releasing lever configured to release the maintenance of the unlocked state, wherein the unlocked-state releasing lever includes a rotational operating portion configured to rotate in a first direction in cooperation with the unlocked-state maintaining lever moved to the maintaining position and to be capable of coming into contact with an operating member in the direction of the relative movement of the upper rail by the rotation thereof in the first direction, and the unlocked-state releasing lever is capable of pressing and moving the unlocked-state maintaining lever in the direction of releasing the maintenance of the unlocked state by rotating in a second direction opposite from the first direction upon a contact between the rotational operating portion and the operating member and is capable of rotating in the first direction to a position where a rotational operation upon the contact with the operating member is disabled without moving the unlocked-state maintaining lever from the maintaining position.

In the configuration described above, the maintenance of the unlocked state at a position where the operating member thereof comes into contact with the rotational operating portion may be released by setting the operating member which comes into contact with the rotational operating portion by the relative movement of the upper rails with respect to the lower rails, that is, by the seat sliding operation. Then, the interference between the both is avoided by rendering the operating member incapable of coming into contact with the rotational operating portion except when the unlocked state is maintained by the operation of the unlocked-state maintaining lever. When the operating member comes into contact with the rotational operating portion by the seat sliding operation in the direction opposite from that in the case where the maintenance of the unlocked state is released, the unlocked-state releasing lever is rotated to a position where the rotational operation is disabled on the basis of the contact with the operating member. Accordingly, the rotational operating portion may be avoided from being caught by the operating member in the course of the seat sliding operation using the walk-in feature in which the unlocked state is maintained. Consequently, the walk-in feature may be secured without depending on the shape of the operating member. Accordingly, higher design flexibility may be secured including the mode of restoration from the unlocked state (release of maintenance) on the basis of the setting of the operating member.

According to a second aspect of the embodiment disclosed here, the unlocked-state maintaining lever is provided so as to be rotatable at a position intersecting the unlocked-state releasing lever by the rotation of the unlocked-state releasing lever, the unlocked-state releasing lever is brought into abutment with the unlocked-state maintaining lever by being urged by a resilient member in the second direction.

In the configuration described above, the unlocked-state releasing lever may be rotated in conjunction with the unlocked-state maintaining lever on the basis of a resilient force of the resilient member. Then, when there is an input of an external force resisting the resilient force (contact of the operating member) with respect to the rotational operating portion of the unlocked-state releasing lever, the unlocked-state releasing lever may be rotated in the first direction without the operation of the unlocked-state maintaining lever already at the maintaining position.

According to a third aspect of the embodiment disclosed here, the specific seat operation is a forward folding operation of the seatback.

In the configuration described above, the walk-in feature may be used by the same operation as many seat sliding apparatuses.

According to a fourth aspect of the embodiment disclosed here, the unlocked-state releasing lever is configured in such a manner that the rotational operating portion projects sideways of the seat when rotating in the first direction in conjunction with the unlocked-state maintaining lever configured to move to the maintaining position.

In the configuration described above, the operating member may be set to a given position capable of coming into contact with the rotational operating portion on the side of the seat. With the existence of the rotational operating portion on the side of the seat, the unlocked-state releasing lever may be operated manually by a passenger of the vehicle. For example, in recent years, the number of vehicles which allow various seat position changes (seat arrangements) increases. In such vehicles, a situation in which the seat cannot be moved to a position where the operating member is set may occur depending on the seat position. However, in the configuration described above, the seat may be fixed after the maintenance of the unlocked state has released by the manual operation in this situation as well. Consequently, the convenience of a user may be improved.

According to a fifth aspect of the embodiment disclosed here, the operating member is set to a next seat arranged on the side of the seat.

In the configuration described above, the maintenance of the unlocked state at a position aligned with the next seat is released and the seat may be fixed. Consequently, the convenience of the user may be improved.

According to a sixth aspect of the embodiment disclosed here, the operating member is set to a fixed portion of the vehicle whose position with respect to the upper rail is changed by the relative movement of the upper rail.

In the configuration described above, the maintenance of the unlocked state is released at a position where the operating member is set as a fixed point and the seat may be fixed.

According to a seventh aspect of the embodiment disclosed here, the rotational operating portion is configured not to be exposed from an external surface of the seat.

In the configuration described above, contact of the passenger with the rotational operating portion may be avoided. Consequently, an effect such that occurrence of malfunction may be restrained, for example, is achieved.

According to this disclosure, a seat sliding apparatus capable of securing higher design flexibility while securing a walk-in feature may be provided.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle seat sliding apparatus comprising:
a lower rail fixed to a floor of a vehicle;
an upper rail to which a seat is fixed and which is provided so as to allow a relative movement with respect to the lower rail;
a locking mechanism configured to be capable of restraining the relative movement of the upper rail with respect to the lower rail;
unlocking mechanism configured to cause the locking mechanism to perform an unlocking operation upon a specific seat operation;
an unlocked-state maintaining lever configured to maintain the locking mechanism in an unlocked state in cooperation with the unlocking mechanism by moving to a maintaining position in conjunction with the unlocking mechanism; and
an unlocked-state releasing lever configured to release the maintenance of the unlocked state,
wherein
the unlocked-state releasing lever includes:
a rotational operating portion configured to rotate in a first direction in conjunction with the unlocked-state maintaining lever moved to the maintaining position and to be capable of coming into contact with an operating member in the direction of the relative movement of the upper rail by the rotation thereof in the first direction, and
the unlocked-state releasing lever is configured to press and move the unlocked-state maintaining lever in the direction of releasing the maintenance of the unlocked state by rotating in a second direction opposite from the first direction upon a contact between the rotational operating portion and the operating member and is capable of rotating in the first direction to a position where a rotational operation upon the contact with the operating member is disabled without moving the unlocked-state maintaining lever from the maintaining position.

2. The vehicle seat sliding apparatus according to claim 1, wherein the unlocked-state maintaining lever is provided so as to be rotatable at a position intersecting the unlocked-state releasing lever by the rotation of the unlocked-state releasing lever, the unlocked-state releasing lever is brought into abutment with the unlocked-state maintaining lever by being urged by a resilient member in the second direction.

3. The vehicle seat sliding apparatus according to claim 1, wherein the specific seat operation is a forward folding operation of a seatback.

4. The vehicle seat sliding apparatus according to claim 1 wherein the unlocked-state releasing lever is configured in such a manner that the rotational operating portion projects sideways of the seat when rotating in the first direction in conjunction with the unlocked-state maintaining lever configured to move to the maintaining position.

5. The vehicle seat sliding apparatus according to claim 4, wherein the operating member is set to a next seat arranged on the side of the seat.

6. The vehicle seat sliding apparatus according to claim 1, wherein the operating member is set to a fixed portion of the vehicle whose relative position with respect to the upper rail is changed by the relative movement of the upper rail.

7. The vehicle seat sliding apparatus according to claim 6, wherein the rotational operating portion is not exposed from an external surface of the seat.

\* \* \* \* \*